UNITED STATES PATENT OFFICE.

ARNO BEHR, OF PASADENA, CALIFORNIA.

FOOD PRODUCT AND PROCESS OF MAKING SAME.

No. 914,379.     Specification of Letters Patent.     Patented March 9, 1909.

Application filed May 12, 1908. Serial No. 432,440.

*To all whom it may concern:*

Be it known that I, ARNO BEHR, a citizen of the United States, residing at Pasadena, in the county of Los Angeles and State of California, have invented a new and useful Composition of Matter and Process of Making Same, of which the following is a specification.

In the manufacture of starch from Indian corn, the latter is steeped in a weak solution of sulfurous acid in water preparatory to grinding. Having thus been softened, the corn is ground and mixed with water. The hulls and germs are separated from the liquid formed, which is known as starch milk and which is caused to flow over slightly inclined tables upon which the starch settles while the gluten is carried off by the liquid which flows from the lower end of the starch table. Various methods are employed for saving the gluten thus discharged from the starch tables, but the steeping water of the corn has been thrown away as waste until I discovered a method of making starch and cattle food as described in the specification forming part of Letters Patent 491,234, granted to me on February 7, 1893, and application for which was filed October 28, 1892, Serial Number 450,266. In said Letters Patent I have described a method for utilizing the soluble material of the corn, principally consisting of albuminoids, sugar and other carbohydrates, phosphorus compounds and potassium salts. The invention described in said Letters Patent is today exploited commercially on a large scale in the principal starch and glucose factories in this country.

In the specification forming part of the above Letters Patent, I have shown that it has been impossible heretofore to obtain these substances in a dry and concentrated form by the evaporation of the water in which they are dissolved or suspended, because of the nature of the mass which remains after most of the water has been evaporated and which mass forms a viscous syrup which cannot be reduced to complete dryness without undergoing chemical changes, and which even when dried is hygroscopic and becomes sticky and deliquescent. I have continued my research in this direction and have now discovered means of recovering said products. The object of my present invention is to isolate, in a dry form, part of these valuable constituents of the corn especially the nitrogenous-phosphorus compounds.

In carrying out my invention I prefer to proceed as follows: The steeping water obtained in the ordinary way by immersing corn in a dilute watery solution of sulfurous acid of a slightly elevated temperature, after having been withdrawn from the corn, is heated to a temperature of approximately 200 degrees F., whereupon it is rendered alkaline, preferably by ammonia. Thus, practically all of the nitrogenous-phosphorus bodies are precipitated. This precipitate is separated from the liquor by suitable means, such as filter presses, centrifugals and the like. It is then washed with hot water and dried in a suitable apparatus until the moisture content has been reduced to approximately 10%.

Although containing traces of phosphates, which would naturally occur in extracts, such as described above, the principal amount of phosphorus in my new product is present in a masked form, *i. e.*, it cannot be discovered by the reagents ordinarily employed for the detection of phosphates. Continued boiling with concentrated mineral acids will only partially break down my phosphorus substances into phosphates, but upon incineration, the total phosphorus may be determined by the usual methods.

My new product possesses the property of being readily assimilated by living organisms, comparative experiments having shown that the use of my new product, in proper proportion, greatly facilitates fermentation and that the latter proceeds at an accelerated speed. My new product is, therefore, of great value as a yeast food, not only on account of its high nitrogenous-phosphorus contents, but also because of its extraordinary degree of assimilability.

My new product is a grayish-white powder, containing usually from 2 to 3% of nitrogen and from 8 to 15% of phosphorus, being only slightly soluble in water and strong organic acids, substantially soluble in dilute acids and completely soluble in concentrated mineral acids.

Having thus described my invention, what I claim is—

1. The new product derived from corn, consisting principally of nitrogen-phosphorus compounds in a dry state, the phosphorus content of which can be determined by the molybdic method only after incineration, while boiling with concentrated mineral acids partially breaks down the phosphorus substances into phosphates; being slightly soluble in water and strong organic acids, substantially soluble in dilute acids and completely soluble in concentrated mineral acids, substantially as described.

2. The process of separating from the steeping water of corn the principal part of its nitrogenous-phosphorus compounds, consisting in heating the steeping water, rendering the liquid alkaline and isolating the precipitate thus obtained, substantially as described.

ARNO BEHR.

Witnesses:
ALVIN V. HUPFER,
WILLIAM HUPFER.